United States Patent [19]

Piper

[11] Patent Number: 4,483,097
[45] Date of Patent: Nov. 20, 1984

[54] DIAPHRAGM-TYPE GAME CALLER

[75] Inventor: Frank R. Piper, Delmont, Pa.

[73] Assignee: Penn's Woods Products, Inc., Delmont, Pa.

[21] Appl. No.: 379,621

[22] Filed: May 19, 1982

[51] Int. Cl.³ .............................................. A63H 5/00
[52] U.S. Cl. .......................................... 446/207; 43/2
[58] Field of Search ................... 43/1, 2; 46/180, 179, 46/178, 182; 84/330, 375

[56] References Cited

U.S. PATENT DOCUMENTS

| 711,090 | 10/1902 | Zilkie | 46/180 |
|---|---|---|---|
| 1,219,241 | 3/1917 | Buchler | 46/182 |
| 1,367,176 | 1/1921 | Bridges | 46/180 |
| 2,133,440 | 10/1938 | Fortuna | 46/180 |
| 2,570,816 | 10/1951 | Kimple | 46/180 X |
| 3,738,056 | 6/1973 | Schultz | 46/178 |
| 4,218,845 | 8/1980 | Evans et al. | 46/180 |
| 4,341,037 | 7/1982 | Moss | 46/180 X |

*Primary Examiner*—Nicholas P. Godici
*Assistant Examiner*—P. Weston Musselman, Jr.
*Attorney, Agent, or Firm*—Clifford A. Poff; Thomas H. Murray

[57] ABSTRACT

A game caller has a size and a wafer-like shape for support against the roof of a user's mouth and includes two diaphragms that are supported in spaced apart relation by a frame in one embodiment and two frames in a different embodiment. A further embodiment provides that a frame is divided into portions for holding and spacing the diaphragms. Each diaphragm is tensioned and held to present an exposed edge portion which is caused to vibrate by impingement with exhausted pulmonary air from the user. A casing engages the exposed parts of the frame and extends outwardly therefrom to hold the assembly together as a unit.

3 Claims, 6 Drawing Figures

DIAPHRAGM-TYPE GAME CALLER

BACKGROUND OF THE INVENTION

This invention relates to a game caller having a size and wafer-like shape suitable for support against the roof of a user's mouth so that exposed edge portions of two diaphragms retained together as a unit in spaced-apart relation can concurrently vibrate when impinged by exhausted pulmonary air from the user. More particularly, the present invention relates to the construction and relationship of a combination of parts forming such a game caller.

The game caller of the present invention is particularly suitable for use by sportsmen while hunting wild game, such as turkey. A game caller having a single diaphragm is known in the art. Such a caller includes a diaphragm supported by a bendable frame, usually made of aluminum, with outside covering or a plastic sheet to bond the assembly together. The caller is used by fitting it against the roof of a user's mouth where exhausted pulmonary air is directed to vibrate the diaphragm. The sound-producing capabilities of such a caller are limited and cannot be used to produce the variety of complex sounds made by a wild turkey in its natural habitat. The diaphragm of the caller can be tensioned and operated to produce certain types of single tone-like sounds which turkeys are known to make but cannot be used to produce, for example, double note whistle-like sound and a raspy tone of a yelp. Hand-held call devices are undesirable because they cause movement by the hunter and their bulk renders them cumbersome to transport.

SUMMARY OF THE INVENTION

It is an object of the present invention to provide an improved game caller capable of producing complex tones comprised of multiple frequencies to simulate a great variety of sounds made by wild game, particularly turkey.

It is a further object of the present invention to provide a game caller embodying an improved construction and relationship of parts including two diaphragms for operation as a unit by impingement with exhausted pulmonary air of the user.

More particularly, the present invention provides a game caller having a size and wafer-like shape suitable for support against the roof of a user's mouth for impingement with exhausted pulmonary air to simulate sounds normally made by wild game, the caller including two diaphragms, and means extending about substantially coextensive peripheral segments of each diaphragm for retaining them together as a unit in a spaced-apart relation and presenting an exposed edge portion of each diaphragm to concurrently vibrate when impinged by exhausted pulmonary air of the user. One form of the game caller includes a frame having a window with the frame being bent over to form two half portions, each for supporting one of the diaphragms. A spacer is placed between the two diaphragms between bent-over portions of the frame to maintain the diaphragms in a spaced-apart and superimposed relation. A fastener, a casing, rivets or tangs are used to interconnect the bent-over portions of the frame. In another form, two frames are provided each having a window. A bent-over half of each frame is pressed onto the remaining half for supporting one of the diaphragms. A fastener is used to hold the frames in a superimposed relation such that parts of the frames maintain the diaphragms in a spaced-apart and superimposed relation. In still another aspect of the present invention, a frame is provided having a window with a bent-over part of the frame to form first and second frame half portions. The first frame half portion is divided into inner and outer frame segments. One of the diaphragms is supported between a second frame half portion and one of the frame segments and the other diaphragm is supported between the inner and outer frame segments. A fastener is used to hold the frames and the diaphragms together.

These features and advantages of the present invention as well as others will be more fully understood when the following description is read in light of the accompanying drawings, in which.

Figure 1:
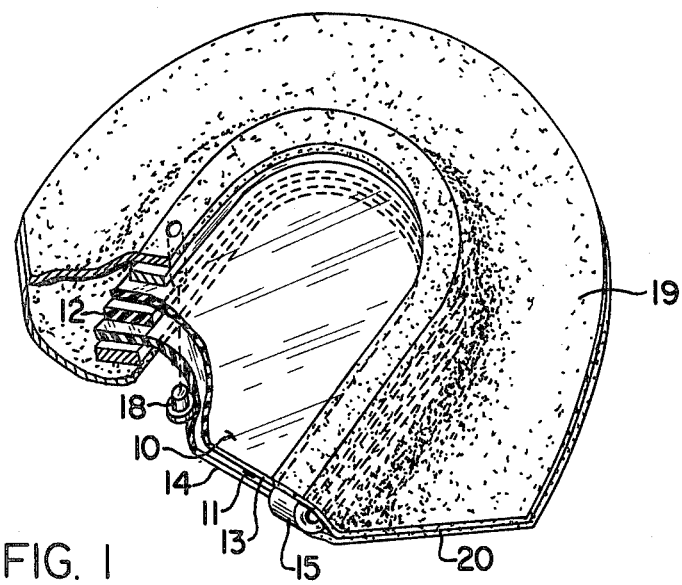
FIG. 1 is an isometric view of a game caller with parts broken away for clarity to better illustrate one embodiment of the game caller of the present invention.

The diaphragm-type game caller shown in FIG. 1 includes two diaphragms 10 and 11, respectively, made of latex or other suitable material that are placed against opposite sides of a horseshoe-shaped spacer 12. The diaphragms 10 and 11 preferably have straight frontal edges 13 and 14, respectively. The diaphragms are stretched to a desired tension and held in a superimposed relation between bent-over half portions of a frame 15. One half portion of the frame extends along the top of diaphragm 10 and the other half portion extending along the bottom of diaphragm 11.

Figure 2:
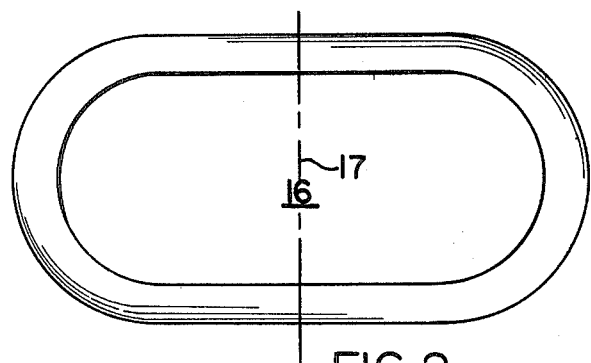
FIG. 2 is a plan view of a frame used to form part of the game caller shown in FIG. 1.

As shown in FIG. 2, the frame has an elliptical configuration with a centrally-disposed window 16. The frame is typically made of aluminum, plastic or other suitable material that is capable of taking a permanent set when half of the frame is bent over to the other half. Bend line 17 depicts the symmetrical relation between the bent portion of the frame. A fastener is used to hold the frame about the exposed peripheral edge portions of the diaphragms with the spacer 12 sandwiched between the diaphragms. As shown in FIG. 1, the frame 15 is situated with respect to the diaphragms such that the reverse bend portion of the frame traverses a gap between the diaphragms and spans across outer edge segments to the front edges 13 and 14. In one embodiment of the present invention, the fastener comprises a plurality of rivets 18 that are passed through suitable opening in the frame, diaphragms, and spacer 12. While only one such rivet 18 is shown in FIG. 1, it is to be understood that a plurality of such rivets are situated at spaced apart locations about the frame. In addition to rivets, or in place thereof, the game caller of the present invention preferably includes a casing 19 having a C-shaped configuration with an inner edge overlying and adhered to each bent portion of the frame at opposite sides of the call. The casing is preferably made of surgical grade adhesive tape or latex sheets that are bonded together along peripheral mating surfaces 20.

Figure 3:
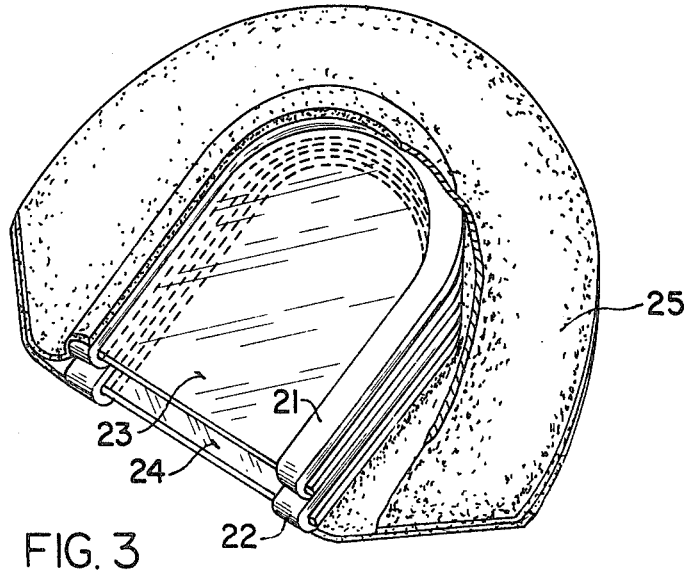
FIG. 3 is a view similar to FIG. 1 but illustrating a second embodiment of the present invention.

In FIG. 3 a second embodiment of the present invention is shown and includes two frames 21 and 22 to support diaphragms 23 and 24, respectively. Frame 21 which is constructed in the same manner as frame 15 described above is bent over to form two half portions which extend along opposite peripheral segments of diaphragm 23. Frame 22 supports diaphragm 24 in the same manner as frame 21 supports diaphragm 21. The half portion of frame 23 underlying diaphragm 23 is positioned on the upper half portion of frame 22 whereby these half portions of the frames maintain the diaphragms 23 and 24 in a spaced apart relation. An exposed edge portion of each diaphragm is presented between the reverse bends of the frames so that the diaphragms can concurrently vibrate when impinged by exhausted pulmonary air of the user. The frames 21 and 22 are held in their superimposed relation as shown by a fastener which comprises a casing 25 made up of two C-shaped segments with the inner peripheral edge portion of the segment adhered to the exposed upper and lower bent half portions of frames 21 and 22 for maintaining them together as a unit. The casing 25 is in all other respects the same as casing 19 of FIG. 1. Moreover, additional fasteners can be used such as rivets with or without the casing.

Figure 5:
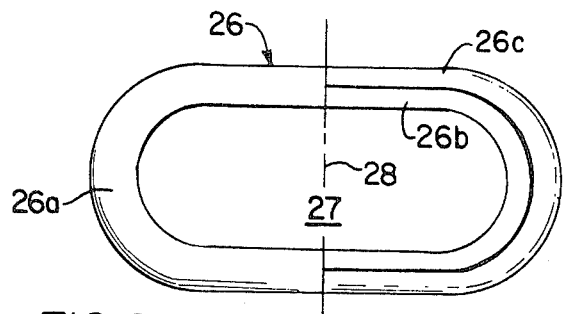
FIG. 5 is a plan view of a frame forming part of the embodiment of the present invention shown in FIG. 4.
Figure 4:
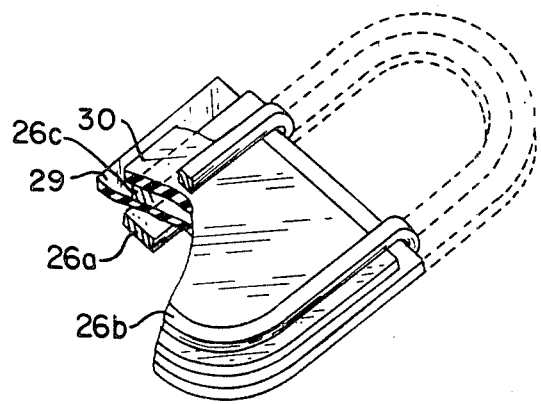
FIG. 4 is an isometric view at the rear portion of a game caller with parts broken away to better illustrate a third embodiment of the present invention.

FIGS. 4 and 5 illustrate a further embodiment of the present invention. As shown in FIG. 5, a frame 26 is similar to frame 15 and includes a window 27. Bend line 28 establishes two half portions of the frame, one of which is identified by reference numeral 26a and the other divided into inner and outer frame segments 26b and 26c, respectively. As shown in FIG. 4, the frame 26 is used to support two diaphragms 29 and 30 by arranging the diaphragm 29 across frame portion 26a. Outer frame segment 26c is then bent over onto the top surface of diaphragm 29 for holding it as well as forming a spacer to maintain a gap between diaphragm 29 and diaphragm 30 which is placed on top of the bent over portion of frame 26c. Diaphragm 30 is held by bending over frame portion 26b onto the exposed top surface thereof. Frame portion 26c serves to hold both diaphragms but also forms a spacer therebetween. It is to be understood however, that frame portions 26b and 26c can be reversed whereby the top surface of diaphragm 30 will be engaged by frame portion 26c. The diaphragms are retained by the frames and a casing, now shown, in essentially the same manner as already described in regard to casings 19 and 25.

Figure 6:
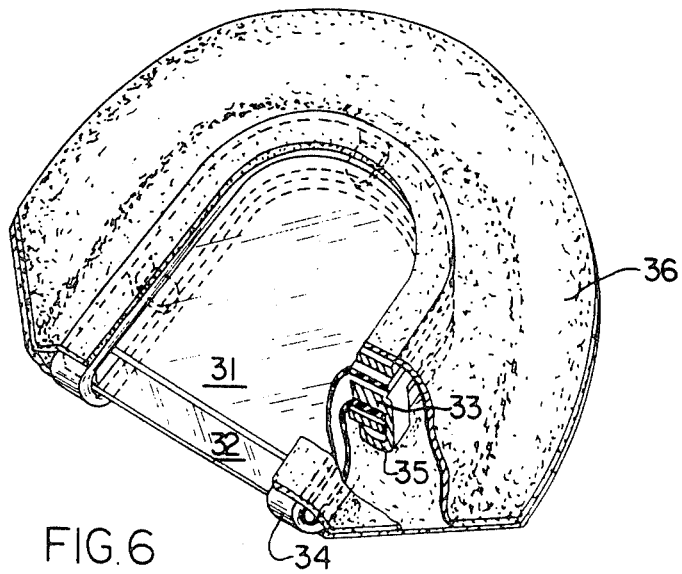
FIG. 6 is an isometric view similar to FIGS. 1 and 3 but illustrating a fourth embodiment of the present invention.

FIG. 6 illustrates a still further embodiment of the present invention in which diaphragms 31 and 32 are held in a spaced apart relation by interposing a C-shaped spacer 33 between the diaphragms. The diaphragms are held against the spacer by a frame 34 which is constructed in the same manner as frame 15. The embodiment of FIG. 6 provides that the spacer 33 has a plurality of tangs 35, three of which are shown in FIG. 6, that project outwardly from the gap between the diaphragms where they are bent over onto a half portion of frame 34. These tangs form fasteners for holding the diaphragms and frame together as a unit. A casing 36 is preferably used to form an outer covering. Casing 36 is constructed in the same manner as already described in regard to casing 15 and 25.

In each of the embodiments of the present invention described above, two superimposed diaphragms are spaced apart and stretched to a desired tension. The diaphragms may be tensioned to different values to produce different vibratory sounds when exposed edge portions of the diaphragms are impinged by exhausted pulmonary air of the user. The exposed edge portions may be offset whereby one edge portion is recessed from the other to any desired extent usually not exceeding ½ of an inch or the edge portions can be aligned, one above the other, when stretched across half portions of the frame or frames to hold them. Moreover it is to be understood that when a casing is used to form part of the fastening means for holding the game caller together, the casing may comprise a liner and an outer wrap which will usually coextend about the outer periphery of the call except for edge portions of the diaphragms which are exposed for impingement with air. If desired, the casings when comprised of two pieces, may be held together by staples or other fasteners instead of adhesives.

While I have shown and described certain embodiments of my invention, I intend to cover as well any change or modification therein which may be made without departing from the spirit and scope of the invention.

I claim as my invention:

1. A game caller having a size and wafer-like shape suitable for support against the roof of a user's mouth while caused to vibrate by impingement with exhausted pulmonary air to simulate sounds normally made by wild game, said caller including two diaphragms, means extending about substantially coextensive peripheral segments of each diaphragm for retaining them together as a unit in spaced-apart relation and presenting an exposed edge portion of each diaphragm concurrently to vibrate when impinged by exhausted pulmonary air of the user, said means including a frame having a window, said frame being bent over to form first and second frame half portions, the first frame half portion being divided into inner and outer frame segments, one of said diaphragms being supported between said second frame half portion and one of said frame segments and the other of said diaphragms being supported between said inner and outer frame segments, and a fastener to hold said frame and said diaphragms together.

2. The game caller according to claim 1 wherein said fastener includes a casing.

3. The game caller according to claim 1 wherein said means holds said diaphragms with an exposed edge portion of one diaphragm overlying the other diaphragm.

* * * * *